United States Patent [19]
Funahashi

[11] 4,331,349
[45] May 25, 1982

[54] STRUCTURE FOR MOUNTING A SAFETY BELT ARRANGEMENT ONTO AN AUTOMOTIVE VEHICLE

[75] Inventor: Jun Funahashi, Yokohama, Japan

[73] Assignee: Nissan Motor Company, Limited, Yokohama, Japan

[21] Appl. No.: 153,779

[22] Filed: May 27, 1980

[30] Foreign Application Priority Data

May 31, 1979 [JP] Japan .............................. 54-77410[U]

[51] Int. Cl.$^3$ ............................................ B60R 21/10
[52] U.S. Cl. .................................................. 280/801
[58] Field of Search .............. 280/801, 808; 296/35.1, 296/102

[56] References Cited

U.S. PATENT DOCUMENTS

| 2,848,250 | 8/1958 | Sheren | 280/801 |
| 3,834,754 | 9/1974 | Zajichek | 296/35.1 |
| 4,014,588 | 3/1977 | Kohriyama | 296/35.1 |

Primary Examiner—Robert R. Song

[57] ABSTRACT

A structure for securing or mounting a safety belt arrangement onto a floor panel of an automotive vehicle. The structure includes a means for absorbing the force concentrated on a connecting means interposed between a floor panel and a vehicle frame of the vehicle body. The connecting means connects between the floor panel and the vehicle frame through an isolating means. The isolating means is secured at at least one end of the connecting means so as to isolate the floor panel and vehicle frame from a force otherwise applied thereto.

6 Claims, 6 Drawing Figures

STRUCTURE FOR MOUNTING A SAFETY BELT ARRANGEMENT ONTO AN AUTOMOTIVE VEHICLE

BACKGROUND OF THE INVENTION

1. Field of the Invention

The present invention relates generally to a safety belt arrangement for use with an automotive vehicle so as to protect passengers sitting within the vehicle compartment from inertia to which they are subjected when the vehicle is suddenly decelerated. More particularly, the present invention relates to a structure for mounting the safety belt arrangement onto a floor panel of a vehicle body.

2. Description of the Prior Art

As is well known, various constructions of safety belt arrangements are applied to automotive vehicles for protecting passengers sitting within the vehicle compartments from the forces of inertia to which they are subjected due to sudden deceleration of the vehicle. Generally, the safety belt arrangement has a means for extracting and retracting the belt. Such means is operative in response to change of vehicle velocity to restrict the rotation of a reel provided in the means or in response to a relatively high and rapid stretching force applied to the belt to retract the belt. The safety belt is wound around the reel at one end thereof. The other end of the belt is secured onto the floor panel of the vehicle body. When the vehicle is suddenly decelerated and thereby substantially high or heavy inertia is applied to the safety belt arrangement, the floor panel is apt to be deformed due to the bending force and the stretching force applied thereto through the belt. Particularly, in a vehicle having a vehicle body separated from the vehicle frame, such as a truck and so on, the possibility of deformation of the floor panel is higher. By deforming the floor panel, the effect of the safety belt arrangement is decreased thereby subjecting the passengers to danger.

In order to avoid the above-mentioned defect and disadvantages in the prior art, there have been developed various improved constructions of the safety belt arrangements. Generally, such improved constructions include a means for connecting the floor panel to the vehicle frame at the portion of the floor panel adjacent to the portion securing the end of the belt. However, in such construction, the force of stretching and bending the floor panel is apt to be concentrated at the connecting means so that it is required to have sufficient strength to resist the same thereby increasing the thickness of the floor panel. This causes increased weight and cost.

Further in case of connecting the floor panel to the vehicle frame, it is required to isolate the floor panel from vibration of the vehicle frame. In the prior art, isolating the floor panel from the vehicle frame is performed by mechanical means provided in the connecting means therebetween. This possibly complicates construction.

The present invention is to eliminate the abovementioned disadvantage in the prior art and to provide an improved construction for securing the end of the safety belt onto the floor panel of the vehicle body, which is capable of reducing the weight and cost by using relatively light and thinner connecting means.

SUMMARY OF THE INVENTION

Therefore, it is an object of the present invention to provide a structure for securing one end of the safety belt onto the vehicle floor panel capable of effectively preventing the panel from deforming due to the stretching and bending force applied thereto by simple construction.

Another object of the present invention is to provide a means for effectively absorbing the stretching and bending force applied to the connecting means interposed between the floor panel and the vehicle frame.

A further object of the present invention is to provide a means for connecting the floor panel and the vehicle frame, which means is formed from relatively light and thin material to permit reducing the cost therefor.

According to the present invention, there is provided a structure for securing one end of the safety belt onto a floor panel, which structure includes a means for absorbing the force concentrated at a connecting means interposed between a floor panel and a vehicle frame of the vehicle body. The connecting means connected between the floor panel and the vehicle frame through the isolating means. The isolating means is secured at least at one end of the connecting means so as to isolate the floor panel and vehicle frame from a force otherwise applied thereto.

Thus the structure of securing the safety belt can effectively prevent the floor panel from deforming due to force applied thereto and can reduce weight and thickness of the material forming the connecting means by employing the force absorbing means.

BRIEF DESCRIPTION OF THE DRAWINGS

The present invention will become more fully understood from the detailed description given below, and from the accompanying drawings of the several preferred embodiments of the present invention, which, however, are not to be taken limitative of the present invention in any way, but are for the purpose of elucidation and explanation.

In the drawings.

DESCRIPTION OF THE PRIOR ART

Figure 1:
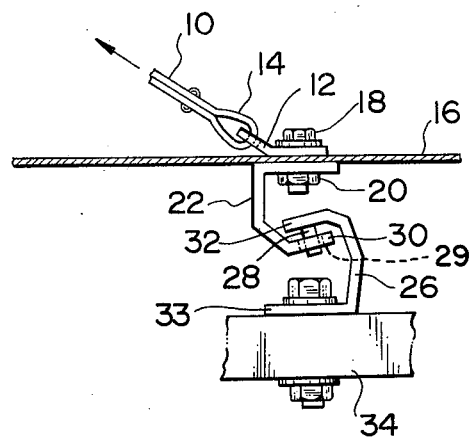
FIG. 1 is a partial sectional view of a safety belt arrangement, showing a structure securing one end of the safety belt onto the floor panel of the vehicle body according to the prior art.

Now, we explain one typical construction of the conventional structure for securing the safety belt, which is disclosed in Japanese Patent Publication No. 49-49539. In the Japanese Patent Publication, a safety belt 10 is connected to a connector 12 at an end 14. The connector 12 is secured onto a floor panel 16 by a bolt 18 and a nut 20. At the opposite surface of the floor panel 16, a substantially channel shaped bracket 22 is secured by the bolt 18 and nut 20 in common with the foregoing connector 12 at the flange portion 24 thereof. The bracket 22 is hinged to another bracket 26 by a pivot pin 28 at the other flange portion 30. The pivot pin 28 protrudes from a flange portion 32 of the bracket 26. The pivot pin 28 is loosely engaged with a hole 29 formed in the flange portion 30 of the connecting element 22. The length of the pivot pin 28 is slightly longer than the thickness of the flange portion 30 and the diameter thereof being substantially smaller than that of the hole 29 so that each one of the connecting elements 22 and 26 can move freely in all directions with respect one another. The pin-and-hole engagement acts as shock or vibration absorbing structure. On the other hand, at the other flange portion 33, the bracket 26 is secured on a vehicle frame 34.

As shown in FIG. 1, the connecting elements 22 and 26 are made of relatively thick metal plate so that they can resist concentrated force applied thereto, when the vehicle is suddenly decelerated and thereby the safety belt is subjected to inertia. This may cause increasing the weight thereof and naturally increasing the cost therefor. Further, it will be naturally understood that, since there are provided two brackets 22 and 26 for connecting the floor panel and the vehicle frame, the structure becomes complicated to possibly cause damage therebetween. Particularly, regarding the pin-and-hole engagement, considerable heavily concentrated force will be applied which can damage it. For purposes of preventing the pivot pin 28 and the hole 29 from being damaged, it is necessary to increase thickness of the bracket 26 and the pivot pin 28 protruding therefrom.

There is provided the pin-and-hole engagement to absorb the stretching force or vibration applied to the connector element. The pin-and-hole engagement is substantially a complicated construction. Further, such construction can not satisfactorily absorb the force or vibration, the vibration is transmitted to the safety belt to impair the comfort of the person wearing the belt.

DESCRIPTION OF THE PREFERRED EMBODIMENT

Figure 4:
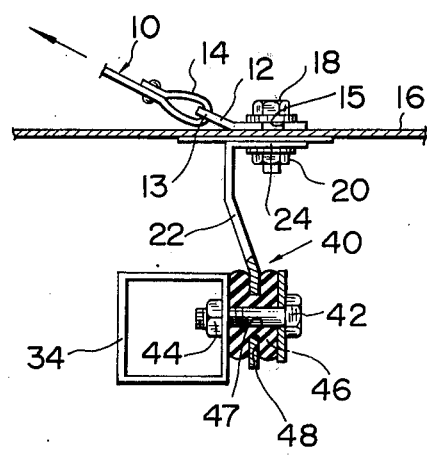
FIG. 4 is a partial sectional view of a safety belt arrangement, showing a structure securing one end of the safety belt onto the floor panel of the vehicle body, according to one embodiment of the present invention.
Figure 2:
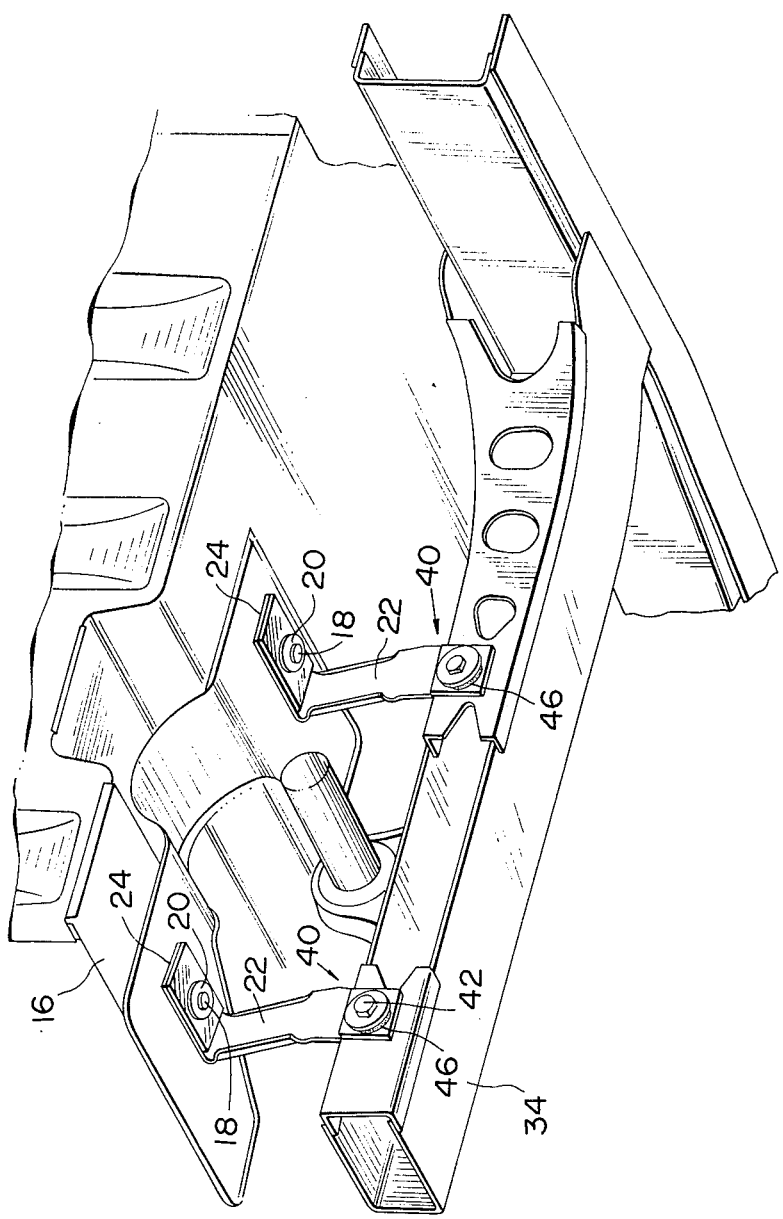
FIG. 2 is a perspective view of a vehicle body at a portion where one end of a safety belt is secured onto a floor panel.
Figure 3:
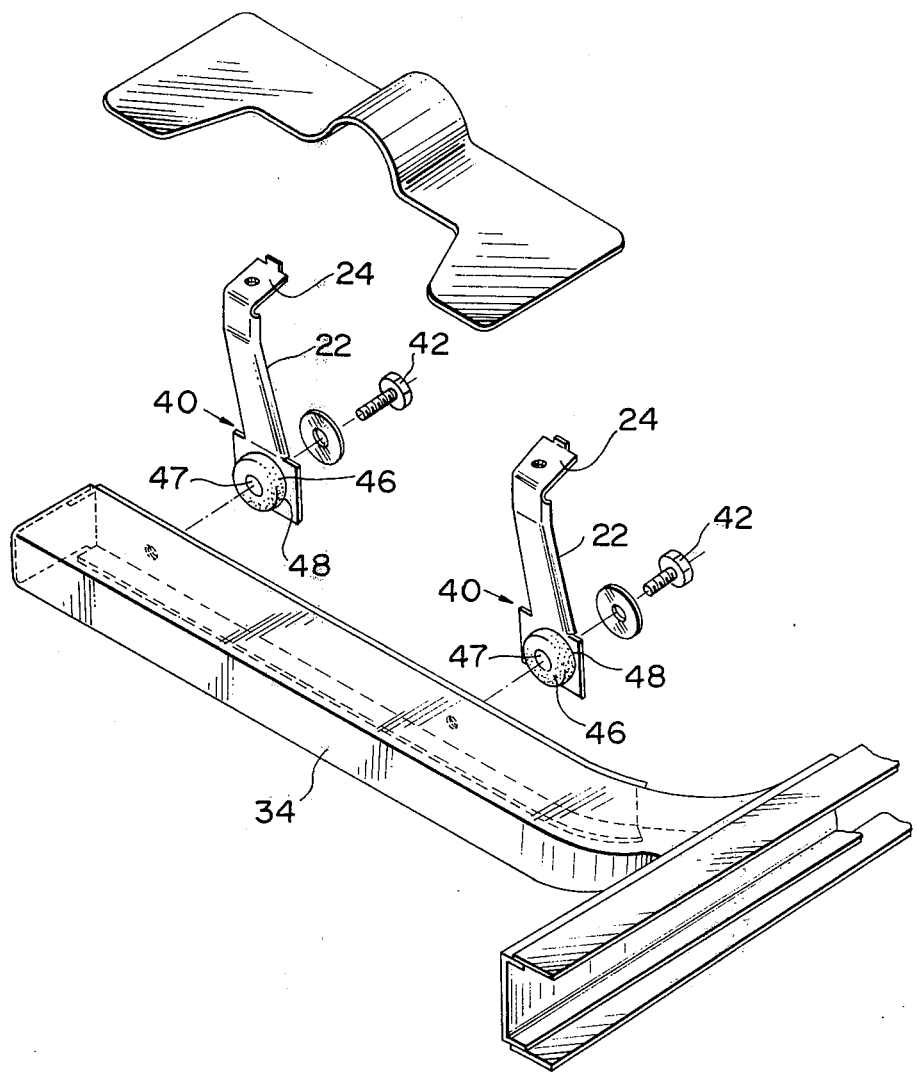
FIG. 3 is an exploded perspective view of a structure of FIG. 2 for connecting the floor panel and a vehicle frame.

Referring now to FIGS. 2 to 4, there is illustrated a structure for securing the end of a safety belt onto the floor panel of a vehicle body, according to one embodiment of the present invention.

It should be noted that, for simplification of explanation, the features and elements substantially having the same function and construction as the foregoing conventional structure will be represented by the same reference numerals.

An end 14 of a safety belt 10 is formed with a loop by turning over the end thereof. Through the looped end 14, the safety belt 10 is connected with a connector 12. The connector 12 is provided with a ring portion 13 for loosely receiving the looped end 14. On the other hand the connector 12 is provided with an opening 15 through which the connector 12 is fixedly connected with the upper surface of a floor panel 16 by a bolt 18 and a nut 20. The bolt 18 extends through the floor panel 16 and goes to the lower side of the floor panel to engage with an upper flange portion 24 of a bracket 22. The bracket 22 has a lower end portion 40 provided therein with a hole. The bracket is secured on a vehicle frame 34 through an isolating member 46 made of elastic material such as rubber, elastic resin or the like, by a bolt 42 and a nut 44 at the transversely intermediate portion. Although the isolating members illustrated herewith are all made of per se elastic material, it will be possible to form the member from a solid member, for example, a helical spring and so on. In the shown preferred embodiment is employed the rubber isolating member which provides advantages, i.e. not only isolation between the bracket and vehicle frame so as to prevent transmitting vibration of the frame to the bracket but also absorbing a force applied from the safety belt through the vehicle body floor panel. The isolating member 46 is generally of annular disk-shaped configuration and has a central opening 47. The isolating member 46 is formed with an annular groove 48 in which the ring portion 40 of the bracket 22 is received.

Upon assembling the insulating member 46 and the bracket 22, the ring portion 40 is forced to engage with the former. The insulating member maybe elastically deformed for permitting the ring portion 40 of the bracket 22 passing thereover to engage with the annular groove 48. Thereafter, the isolating member 46 and bracket 22 assembly is secured onto the vehicle frame 34 by the bolt 42 and the nut 44. Then, the upper flange portion 24 of the bracket 22 and the connector 12 is secured onto the respective surface of the floor panel by the bolt 18 and nut 20.

The securing structure as constructed above can absorb the force applied in concentrated form to the bracket 22 by the isolating member 46. Therefore, the bracket 22 can be reduced in thickness thus reducing weight and cost.

Figure 5:
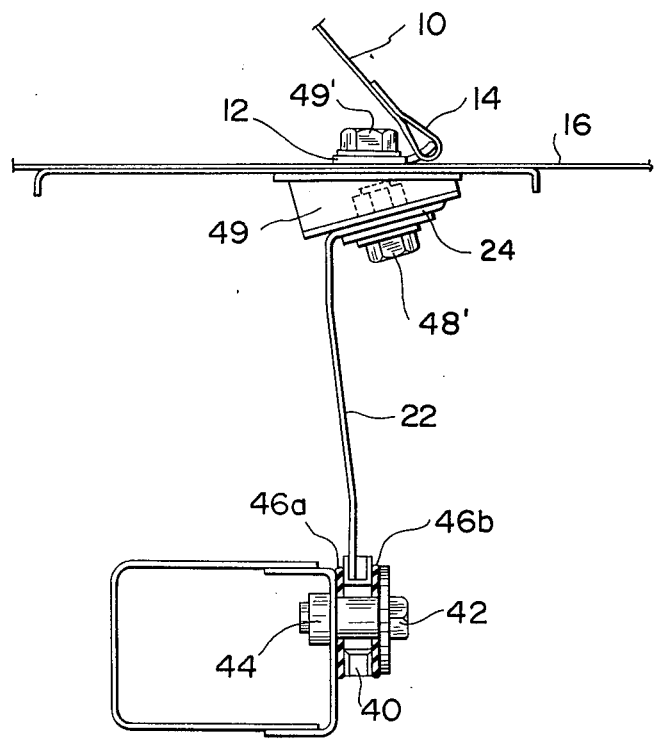
FIG. 5 is a view similar to FIG. 4 showing a modification of the structure shown in FIG. 4.

FIG. 5 shows a modification of the foregoing embodiment of the present invention as discussed with reference to FIGS. 2 to 4. In this modification, the principal difference from the foregoing embodiment is the method of fitting the upper end of the bracket 22 to the lower surface of the floor panel 16. Between the upper end 24 of the bracket 22 and the lower surface of the floor panel 16 is interposed a clamp 49 of generally U-shaped configuration in section. The clamp 49 is secured on the lower surface of the floor panel by bolts 49'. The upper end 24 of the bracket 22 is fitted to the clamp 49 by a bolt 48'. On the lower end of the bracket 22 is fitted a separated, two-piece, annular disk-shaped isolating member 46a, 45b. Through the isolating member 46a, the lower end of the bracket engages the vertical periphery of the vehicle frame. By employing such a separated isolating member, assembling the isolator-bracket assembly can be simplified.

Figure 6:
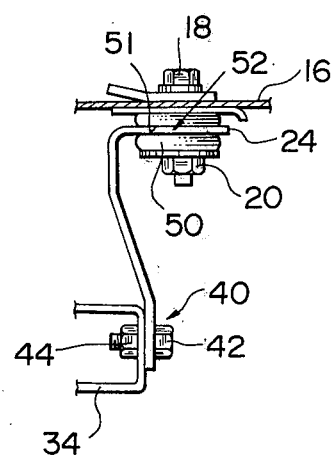
FIG. 6 is a view similar to FIG. 4, showing another embodiment of the present invention.

FIG. 6 shows another embodiment of the present invention. In this embodiment, the isolating member 50 is fitted on the upper flange portion 24. The isolating member is formed with an annular groove 51 at the outer periphery thereof. The upper flange portion 24 of a bracket 22 has a ring portion 52 which engages with the insulating member 50. The lower end of the bracket 22 is secured to a vehicle frame 34 by a bolt 42 and a nut 44. Meanwhile, on the outer surface of the floor panel 16, a connector 12 connected at one end of a safety belt 10 is secured by bolt 18 and nut 20. The bolt 18 and the nut 20 is used in common in order to secure both the insulating member 50 and the connector 12.

Thus constructed the securing structure works substantially the same as the previously explained structure according to the embodiment of the present invention.

While, however the specific constructions are disclosed hereabove for illustration of the present invention, it will be possible to make various modifications for various features or elements of the structure of the present invention. For example, the insulating member may not always be formed in integral form but also be formed in two separate portions. In this case, the insulating member will be held in assembled form by a washer interposed between the bolt head or the nut and the insulating member. Further, for example, the form of the bracket is not necessarily as specified in the shown examples. Therefore, it will be possible to embody the bracket in a different form without departing from the principle of the present invention.

What is claimed is:

1. A structure for securing one end of a safety belt onto a vehicle body, comprising in combination:
    a connector for fastening said one end of said safety belt onto a floor panel of said vehicle body, said connector being fixed onto an upper surface of said floor panel;
    a single, plate-shaped bracket interposed between said floor panel and a vehicle frame, one end of said bracket being secured onto a lower surface of said floor panel, the other end of said bracket being secured onto said vehicle frame; and
    isolating means made of elastically deformable material, said isolating means being fixedly secured at at least one end of said bracket so that it can isolate said one end of said bracket from said floor panel or said other end of said bracket from said frame;
    thereby absorbing a force applied thereto and isolating said floor panel and said safety belt from vibration of said vehicle frame.

2. A structure as set forth in claim 1, wherein said isolating means comprises at least one annular disk.

3. A structure as set forth in claim 1 or 2, wherein said isolating means is formed with an annular groove in which a ring portion of said bracket is received.

4. A structure for securing one end of a safety belt onto a floor panel of a vehicle body, comprising in combination:
    a connector for fastening one end of said safety belt onto a floor panel of said vehicle body, said connector being fixed onto an upper surface of said floor panel;
    a single, plate-shaped bracket interposed between said floor panel and a vehicle frame, a first end of said bracket being secured onto a lower surface of said floor panel, a second end of said bracket being secured onto said vehicle frame; and
    isolating means made of elastically deformable material, said isolating means forming an annular disk and being fixedly secured to said second end of said bracket and located between said frame and said second end so that it can isolate said bracket from said vehicle frame and absorb a force applied to said bracket.

5. A structure as set forth in claim 4, wherein said isolating means is composed of two separate elements between which said second end of said bracket is sandwiched so as to be isolated from said vehicle frame.

6. A structure as set forth in claim 4, wherein said isolating means is formed with an annular groove in which said second end of said bracket is received so as to be isolated from said vehicle frame.

* * * * *

UNITED STATES PATENT AND TRADEMARK OFFICE
CERTIFICATE OF CORRECTION

PATENT NO. : 4,331,349

DATED : May 25, 1982

INVENTOR(S) : Jun Funahashi

It is certified that error appears in the above-identified patent and that said Letters Patent are hereby corrected as shown below:

[30] Foreign Application Priority Data

May 31, 1979 [JP] Japan...........54-74410 [U]

Signed and Sealed this

Third Day of August 1982

[SEAL]

Attest:

Attesting Officer

GERALD J. MOSSINGHOFF

Commissioner of Patents and Trademarks